June 23, 1970  C. F. KLEIN  3,517,225

ELECTROSTATICALLY DRIVEN APPARATUS

Filed Sept. 18, 1967

INVENTOR
CARL F KLEIN
BY
Andrus & Starke
Attorneys

United States Patent Office 3,517,225
Patented June 23, 1970

3,517,225
ELECTROSTATICALLY DRIVEN APPARATUS
Carl F. Klein, Milwaukee, Wis., assignor to Johnson Service Company, Milwaukee, Wis., a corporation of Wisconsin
Filed Sept. 18, 1967, Ser. No. 668,450
Int. Cl. H02n 1/00
U.S. Cl. 310—6                                    6 Claims

ABSTRACT OF THE DISCLOSURE

A rotatable member is driven by an electrostatic electrical field. A ferroelectric material such as barium titanate or the like fills a tubular insulating shell which is rotatably mounted in insulated supports between a pair of parallel electrode plates. A direct current potential is applied to the plates to establish an electric field at right angles to the axis of the rotor unit. Angular displacement of the rotor results in a continued rotation. When operated in air, a discharge region exists wherein ozone is generated.

---

Figure 1:
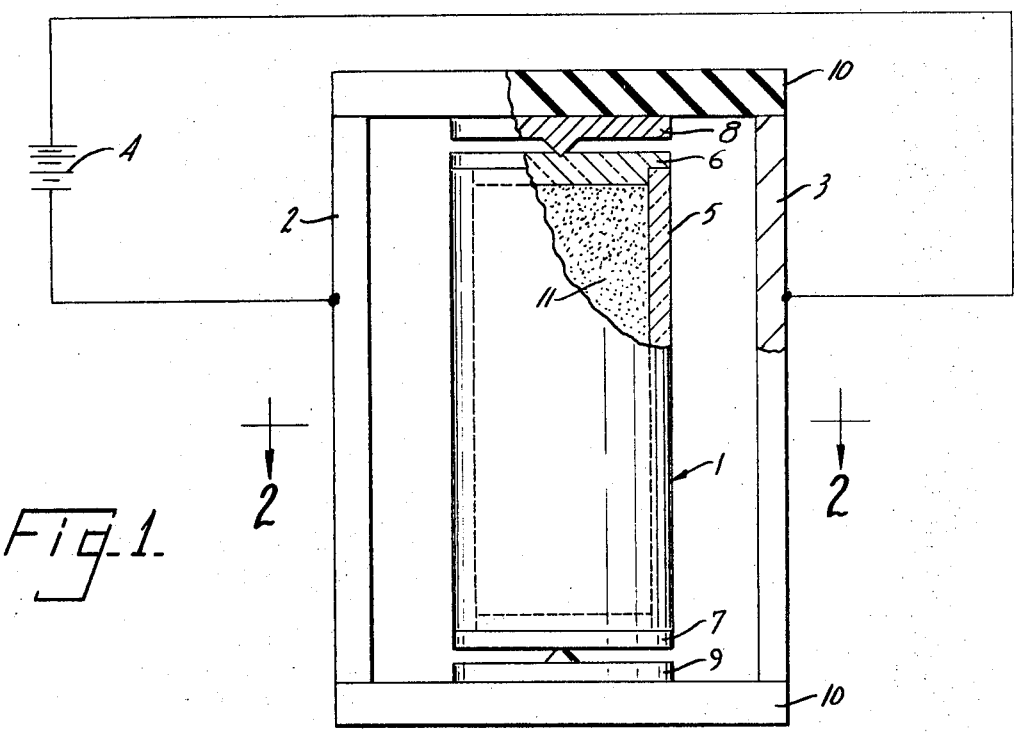

This invention relates to electrostatically driven apparatus and particularly to a member rotatably mounted within an applied electrical field and driven in accordance with relative electrostatic reaction force of the applied field and an induced charge on the member.

Generally, rotating equipment whether driven from alternating current or from direct current has been based on electromagnetic phenomena. The conventional rotating equipment normally includes a field structure and a rotor structure with electromagnetic fields between the rotor and stator establishing rotation of the rotor. Although electrostatic devices have certain advantages and have been suggested, they have not found the wide application of the electromagnetic devices. Electrostatic fields have also been used in rotating equipment. An alternating current driven electrostatic hysteresis motor has, for example, been recently suggested wherein a plurality of capacitive plates are distributed about a rotor member and through a rotating electrostatic field cause rotation of a rotor member.

The present invention is particularly directed to a device having a rotatable member driven by the electrostatic forces established by an applied electrical field. Generally, in accordance with the present invention a dielectric material having a high dielectric constant and subject to polarization is mounted within an outer insulating shell or covering to form a rotor means which is rotatably mounted within the applied field. Slight displacement of the rotor means from a stationary position results in continued rotation of the rotor in the direction of the displacement.

In accordance with a preferred and particular unique construction of the present invention, a ferroelectric material such as barium titanate or the like fills a tubular insulating shell which is rotatably mounted in insulated supports to define a rotor unit. The rotor unit is mounted between a pair of parallel electrode plates and a direct current potential is applied to the plates to establish an electric field at right angles to the axis of the rotor unit. The charge distribution between the plates and particularly on the insulating shell and within the ferroelectric material is such that any slight displacement of the rotor unit from a stationary position results in the continued rotation thereof in the direction of the displacement. Further, in connection with the unit, it has been found that when operated in air, a discharge region exists wherein ozone is generated. This aspect of the apparatus might be employed as either an ozone generator or to provide a control which is responsive to the change in volume and pressure accompanying the conversion between air and ozone.

The present invention thus provides a new and novel electrostatic rotating device which can be driven from a unidirectional electrical field.

The drawing furnished herewith illustrates a preferred construction of the present invention in which the above advantages and features, as well as others, are clearly set forth.

Figure 2:
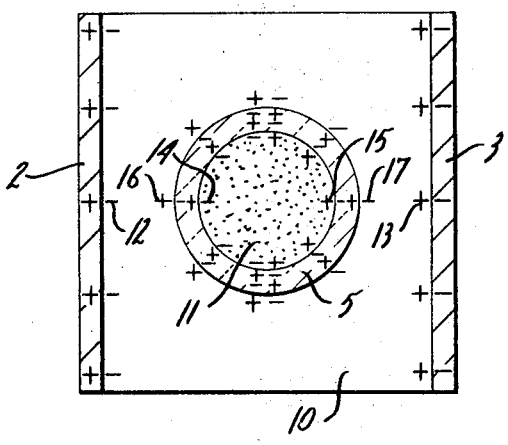
Figure 3:
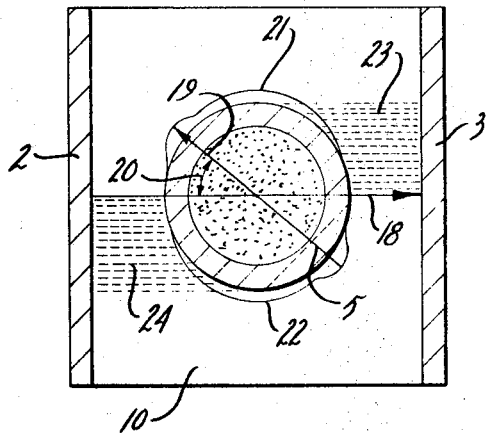

Referring to the drawing:
FIG. 1 is a simplified elevational view of a structure constructed in accordance with the present invention and with parts broken away to show internal details;
FIG. 2 is a horizontal section taken generally on line 2—2 of the apparatus shown in FIG. 1; and
FIG. 3 is a simplified view similar to FIG. 2 illustrating the charge distribution for a theoretical explanation of the operation of the present invention.

Referring to the drawings, and particularly to FIGS. 1 and 2, the present rotating apparatus includes a rotor 1 rotatably mounted between a pair of relatively large conducting plates 2 and 3. A direct current source 4 is connected across the plates 2 and 3 and establishes an electrostatic field which is impressed upon the rotor 1. When the power is first applied to the plates 2 and 3, the rotor is held in a stationary position. However, any slight displacement of the rotor 1 after application of the field results in a continued rotation of that device in the corresponding direction. Thus, if the rotor 1 is turned clockwise, as viewed in FIG. 2, it will continue to rotate in a clockwise direction. Similarly, if the rotor 1 is displaced in a counterclockwise direction, it will continue to rotate in a clockwise direction.

In the illustrated embodiment of the invention, the D.C. source 4 is shown in the battery for purposes of simplicity of illustration. Practically, the D.C. source is a high voltage unit of any well known or desired construction.

The rotor 1 of the present invention, as illustrated in the preferred embodiment, includes an outer tubular shell 5. This shell 5 is formed of glass or any other similar material which has excellent electrically insulating properties. A top end closure 6 is secured to the upper end of the shell 5, and a similar end closure 7 is secured to the bottom end. In the illustrated embodiment of the invention, the rotor 1 is disposed to rotate about a vertical axis and a suitable low friction bearing 8 is secured to the top end closure 6 and a similar bearing 9 is secured to bottom end closure 7. The bearings are mounted in any suitable insulated support 10 to eliminate conduction of electricity from and to the rotor 1.

The shell 5 contains a dielectric material 11 which may be any suitable ferroelectric or other material such as barium titanate, calcium titanate, lead neobate, as well as any other material having similar properties. Generally, the material has high dielectric constant and the characteristics of being polarized particularly by the phenomena of gross orientation which appears to be a highly significant fact in connection with the operation of the present invention.

Generally, the field established between the plates 2 and 3 by the direct current source 4 polarizes the dielectric material 11. This results in an induced charge on the outer surface insulating shell 5 which is maintained because the insulating characteristic of the shell prevents recombination of charges. The distribution is such that once the rotor 1 is turned in any manner, manually, mechanically or by other electrical interacting forces, a torque is established which maintains continued rotation of the rotor 1 in the corresponding direction of angular rotor displacement. The torque necessarily results from the electrostatic energy which is continuously supplied from the direct current source 4 and which is converted into a physical rotation of the rotor 1.

This torque may be explained in terms of the induced charge on the insulating shell 5 and the continued displacement of the polarized dielectric material and its continuous tendency to effect a realignment in the direction of the applied field. This concept is described in connection with the illustration of FIGS. 2 and 3.

Thus, referring particularly to FIG. 2, the charge distribution within the apparatus and particularly upon the initial application of the D.C. potential is shown in FIG. 2 with the charges shown by the conventional plus and minus signs. The positive potential of source 4 is shown applied to the left plate 2 and the negative potential is applied to the right plate 3. As a result, within the air gap between the plates 2 and 3, a negative potential charge 13 appears immediately adjacent the negative plate 2 and a corresponding positive potential or charge 13 appears immediately adjacent the negatvie plate 3. The dielectric material 11 is polarized with a negative charge 14 in the half of the rotor adjacent the positive plate 2 and a corresponding positive charge 15 in the rotor half adjacent the negative plate 3.

The charge in material 11 arises because it is a ferroelectric material whose dipoles are particularly subject to polarization. When the field is applied, there is gross orientation of the small permanent dipoles existing within the ferroelectric material 11. The dipoles realign themselves with the applied field. As a result there is an effective electric charge displacement within the material as shown in FIG. 2. As a result of the insulating characteristic of the shell 5, there is no conduction through the material 11 and consequently the net charge of the dielectric material 11 remains essentially zero.

This polarization of the material 11 establishes a related field within the shell 5. A positive charge forms on the interior adjacent the negative charge of material 11 and a corresponding negative charge on the opposite half of the shell. An opposite or negative charge appears on the interior of the outer portion of shell 5 adjacent plate 2 and a complementing positive charge in the outer portion of shell 5 adjacent plate 3.

This results in induced charge on the insulating shell 5 with a positive charge 16 on its exterior surface adjacent plate 2, and a negative charge 17 on its exterior surface adjacent plate 30.

When the potential is first applied, the charges are symmetrically disposed and in alignment with the principal field lines of the applied field. Consequently, there is no rotating torque applied to the rotor 1. However, if the rotor 1 is displaced, for example, in a clockwise direction, the charges in and on the rotor are displaced. For purposes of explanation, the static fields are vectorially shown in FIG. 3 and include the applied field vector 18 and the net dipolemoment vector 19 which is the summation of the induced dipolemoment on the outer surface of the shell and the dipolemoment of the polarized material 11. The initial displacement thus establishes an angle 20 between the electric field 18 and the net dipolemoment 19, which will be of the polarity illustrated. As the net field on the shell 5 adjacent the positive plate 2 is also positive, a repulsive force is established tending to rotate the rotor in the same direction as the displacement. Similarly, to the opposite side, the displacement of the negative charge on the shell 5 establishes a repulsive force as a result of the negative charge of the negative plate 3. This results in a torque tending to rotate the rotor. The dipoles of the ferroelectric material will tend to realign with the main or applied field. This displacement of the induced dipolemoment on shell 5 and the dipolemoment of the ferroelectric dielectric and the continued tendency of the latter to realign develops an increased positive charge on the outer surface of the glass or shell 5. This displacement under a constant returning force necessarily requires work. This is reflected in an increase in stored energy in the induced field shell 5. The energy is necessarily obtained from the battery or D.C. power supply 40. The rotational force on the rotor is the summation of the force resulting from the induced charge on the shell less the force of the polarized dipoles within the dielectric acting at the distance from the center of rotation. Generally, the rotation of the rotor results in a charge buildup or displacement as generally shown by idealized explanatory lines 21 and 22 for the positive and negative charges respectively. The charge continues to accumulate on the rotating surface of shell 5 until it moves into the effect of the negative field and becomes sufficiently great to cause breakdown of the air between the shell 5 and the opposite polarity plate, thereby developing discharge zones 23 and 24, each of which generally spans an appropriate quarter of the cylinder or shell 5. With the device operating in air, the charge force breaks down the air to form a glow discharge generating ozone.

The areas of breakdown necessarily are the areas of maximum field intensity. Thus, with clockwise rotation the rotor acquires a positive space charge from 0 to 90° and a negative space charge from 180° to 270°. Between the 90 and 180° the magnitude of the electrostatic field between the shell and the negative plate tends to break down the air dielectric thus separating them. Similarly, between 270 and 360° the magnitude of the electrostatic field between the shell and the positive plate tend to break down the air dielectric therebetween. The breakdown of the air which appears as a blue glow and the pungent odor of ozone provides for a continuous electron flow through the device. Thus the air molecules in forming ozone become ionized and negative ions are attracted to the rotor between 90 and 180° and to the positive electrode plate between 270 and 360° for clockwise rotation.

If the rotor were displaced in an opposite or counterclockwise direction, the rotor would continue to rotate in that direction with the two discharge zones in the opposite two quadrants. The formation of ozone is not of any particular significance in obtaining a rotating effect. However, the generation thereof indicates that the device might be employed as an ozone generator. Further, the generation of ozone results in the conversion of three oxygen molecules into 2 ozone molecules. As a result, the volume and pressure would correspondingly change and may provide a mechanical output. The device may be disposed within a sealed bellows-like device or the like, to change the volume and pressure within the bellows unit and thereby provide a mechanical movement.

Various modes of carrying out the invention are contemplated as being within the scope of the following claims particularly pointing out and distinctly claiming the subject matter which is regarded as the invention.

I claim:

1. An electrostatic apparatus, comprising
    means to establish an electrical field, and
    a dielectric material having an outer cover of electrical insulating material to define a rotor unit rotatably mounted in said field with said field passing through the cover and the dielectric material.

2. The electrostatic apparatus of claim 1 wherein said dielectric material is a ferroelectric material.

3. The electrostatic apparatus of claim 1 wherein said dielectric material has a substantial dielectric constant and dipoles which are polarized by said field.

4. The electrostatic apparatus of claim 1 wherein said cover is a tubular shell of glass having end closure members, and said dielectric material is a ferroelectric completely filling said shell.

5. The electrostatic apparatus of claim 1 including bearing means secured to said rotor unit and including means to insulate said cover from the support means.

6. The electrostatic apparatus of claim 1 wherein said cover includes a tubular shell of glass and end closure plates secured to the opposite end of said shell to close the shell, said dielectric material is a ferroelectric completely filling said shell, a bearing support means connected to said end plates and including means to electrically insulate said shell, said means to establish an electrical field including a pair of conducting plates mounted in closely spaced relation to the opposite sides of said shell and means for applying a direct current potential across said plates to establish the electrical field therebetween, said electrical field being at right angles to the axis of said shell.

No references cited.

DAVID X. SLINEY, Primary Examiner

U.S. Cl. X.R.

310—10

UNITED STATES PATENT OFFICE
CERTIFICATE OF CORRECTION

Patent No. 3,517,225            Dated June 23, 1970

Inventor(s) Carl F. Klein

It is certified that error appears in the above-identified patent and that said Letters Patent are hereby corrected as shown below:

Col. 1, line 55, cancel "particular" and substitute therefor ---particularly---
Col. 3, line 17, cancel "13" and substitute therefor ---12---
Col. 3, line 17, cancel "adjacent the negative plate" and substitute therefor ---at the face of the positive plate---

SIGNED AND
SEALED
OCT 20 1970

(SEAL)
Attest:

Edward M. Fletcher, Jr.
Attesting Officer

WILLIAM E. SCHUYLER, JR.
Commissioner of Patents